United States Patent [19]

Walter

[11] 4,045,042
[45] Aug. 30, 1977

[54] TRAVELING UNDERCARRIAGE FOR A CONTAINER OR THE LIKE

[75] Inventor: Josef Walter, Balterswil, Switzerland

[73] Assignee: J. Walter AG, Balterswil, Switzerland

[21] Appl. No.: 671,862

[22] Filed: Mar. 30, 1976

[30] Foreign Application Priority Data

Apr. 4, 1975 Switzerland .................. 4312/75

[51] Int. Cl.² .............................................. B62B 5/00
[52] U.S. Cl. ............................................. 280/79.1 R
[58] Field of Search .............. 280/79.1 R, 106 R; 214/16.1 R, 16.4 R; 104/44; 105/160.5, 157 R

[56] References Cited

U.S. PATENT DOCUMENTS

| | | | |
|---|---|---|---|
| 637,650 | 11/1899 | Northrop | 280/79.1 R |
| 781,427 | 1/1905 | Hussey | 105/160.5 |
| 1,247,781 | 11/1917 | Anderson | 280/79.1 R |
| 3,942,814 | 3/1976 | Buhler | 280/79.1 R |

Primary Examiner—Robert R. Song
Attorney, Agent, or Firm—Ladas, Parry, Von Gehr, Goldsmith & Deschamps

[57] ABSTRACT

A traveling undercarriage for a mobile container or the like, comprising a substantially rectangular-shaped frame having two parallel main supports extending transversely with respect to the direction of displacement of the undercarriage and connected at their ends with one another. Rollers are attached at transverse supports connected with the main supports. The transverse supports carrying the rollers or rolls are detachably secured by connection elements with the main supports. Attachment elements are provided which are suspendible at the main supports and at which there are secured transverse walls of the container.

17 Claims, 9 Drawing Figures

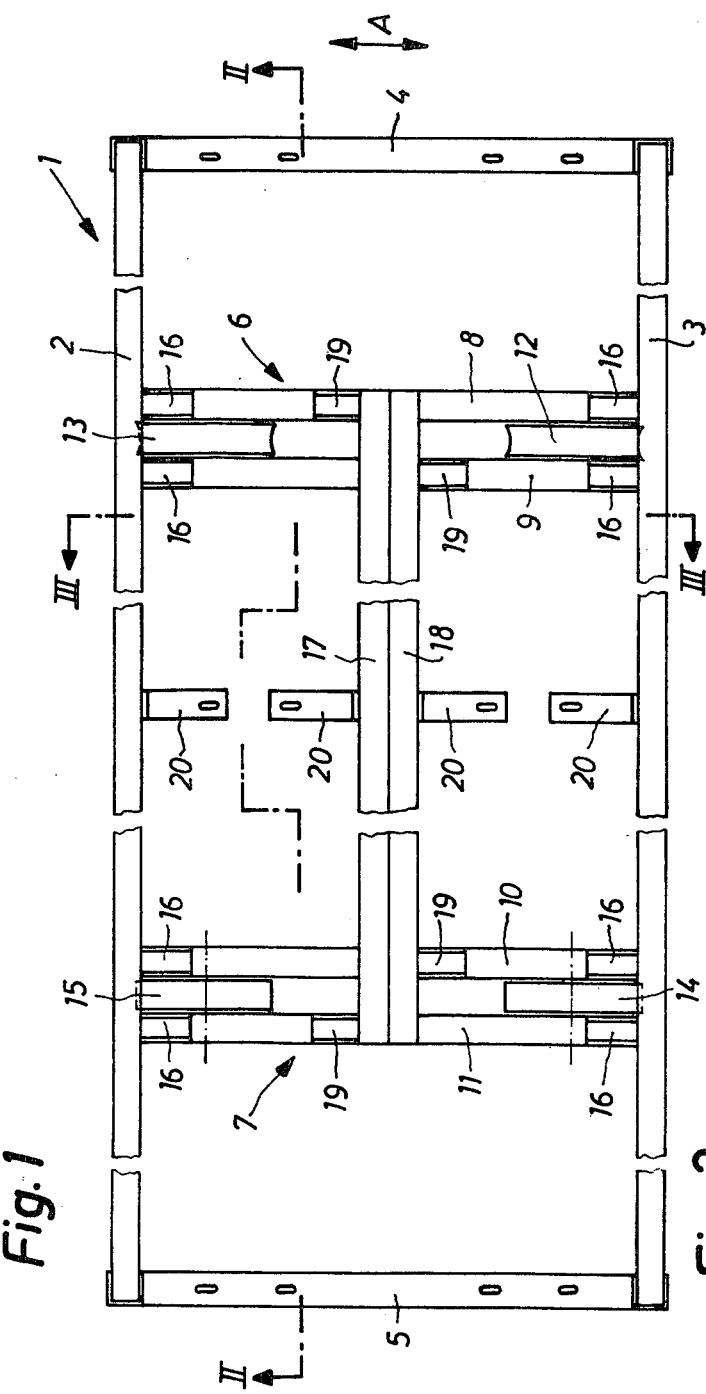
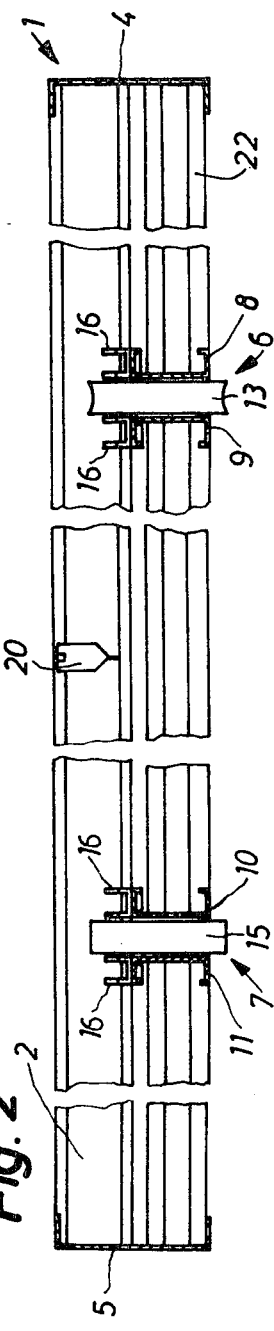
Fig. 1
Fig. 2

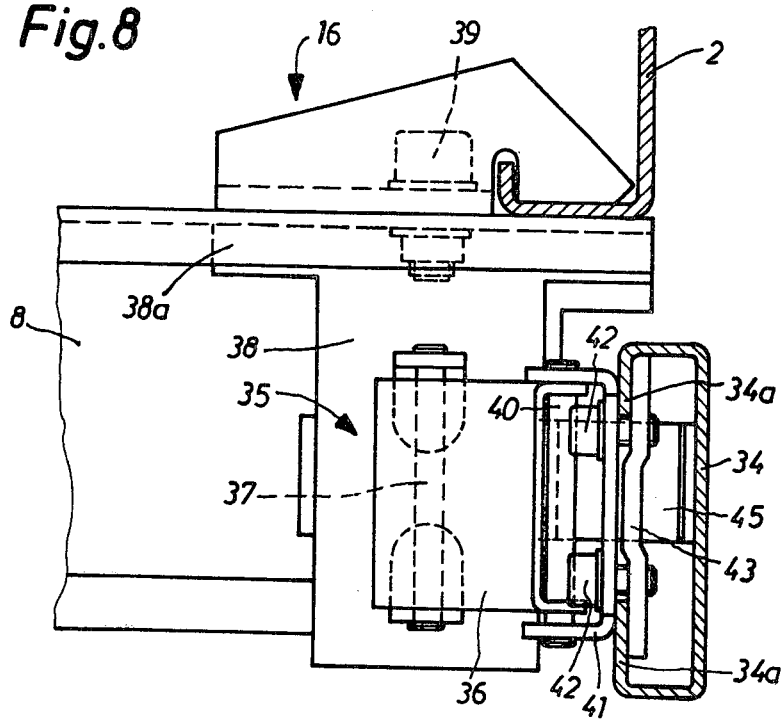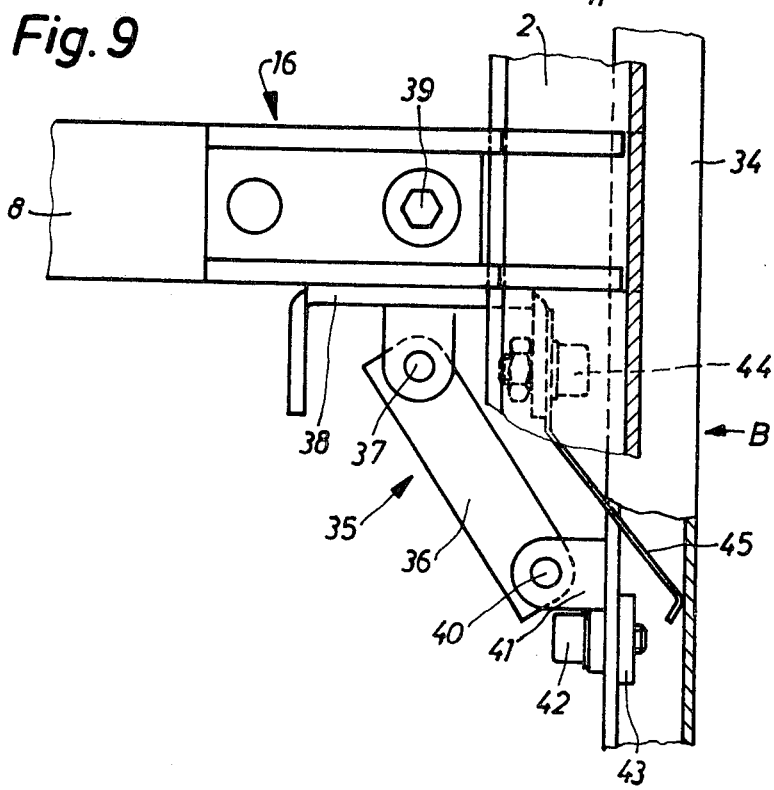

TRAVELING UNDERCARRIAGE FOR A CONTAINER OR THE LIKE

BACKGROUND OF THE INVENTION

A traveling undercarriage or supporting frame or the like for a container, crate, box or the like—hereinafter simply referred to as a container—wherein the container is rollably shiftable by means of the traveling undercarriage. In particular, the traveling undercarriage of the present invention is of the type comprising a substantially rectangular-shaped frame having two substantially mutually parallel main supports extending transversely with respect to the direction of displacement of the traveling undercarriage, the main supports being connected with one another at their ends and there further being provided rolls or rollers secured to transverse supports connected with the main supports.

There are already known to the art storage devices, for instance from Swiss Pat. Nos. 394,040 and 444,030, which incorporate a multiplicity of mutually parallel, mobile containers which can be selectively displaced away from or towards one another by a motor or manually, so as to form an access passageway between two neighboring containers. By means of this access passageway there is also provided accessibility to the containers. The containers consist of a traveling undercarriage which supports a structure, for instance formed of wood or metal, in the form of shelving, partition, a rack or a cabinet. This undercarriage is rectangular in configuration and possesses two parallel main supports extending transverse to the displacement direction. The main supports are connected at their ends by means of side supports welded with the main supports. The main supports and side supports form a frame.

Furthermore, internally of the frame there are arranged transverse supports extending parallel to the direction of displacement and at which there are mounted the rolls traveling upon rails. Also these transverse supports are welded with the main supports. Usually there are provided two such type roller arrangements disposed in spaced relationship from one another.

In order to support and attach the transverse walls of the structure extending parallel to the displacement direction, and at which transverse walls there are braced the shelves of the structure, there are provided at the frame support carriers welded to such frame and upon which there are supported such transverse walls and at which there are fastened the transverse walls.

For the manufacture of such type undercarriage welded together from supports there are required appropriate welding machines. Additionally, exacting work is demanded since after the welding operations have been completed it is no longer possible to correct the position of the transverse supports and the support carriers.

Due to the weld connection between the supports it is therefore not possible to subsequently change the spacing between the roller arrangements and the position of the support carriers supporting the transverse walls. If an error arises during manufacture, or if subsequently the purchaser wishes a modification, then a once-manufactured undercarriage cannot be modified and must therefore be replaced by a new undercarriage.

SUMMARY OF THE INVENTION

Hence, with the foregoing in mind it is a primary object of the present invention to overcome the aforementioned drawbacks and limitations of the prior art proposals discussed above.

Another and more specific objective is the provision of an undercarriage of the previously mentioned type which can be fabricated in relatively simple manner and is constructed such that at any time it is possible to change the position of the rollers or rolls and the transverse walls of the structure of the container relative to the frame.

Now in order to implement these and still further objects of the invention, which will become more readily apparent as the description proceeds, the taveling undercarriage of this development is manifested by the features that the transverse supports which carry the rollers or rolls are detachable connected by means of connection elements with the main supports. Further, there are provided attachment elements which can be suspended at or in the main supports and at which there are secured the transverse walls of the container.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a top plan view of a traveling undercarriage constructed according to the teachings of the present invention;

FIG. 2 is a cross-sectional view taken substantially along the line II—II of FIG. 1;

FIG. 8 is a cross-sectional view through a protection barrier or beam arrangement and its connection with the undercarriage frame; and FIG. 9 is a plan view of the arrangement of FIG. 8.

DETAILED DESCRIPTION OF THE INVENTION

Figure 3:
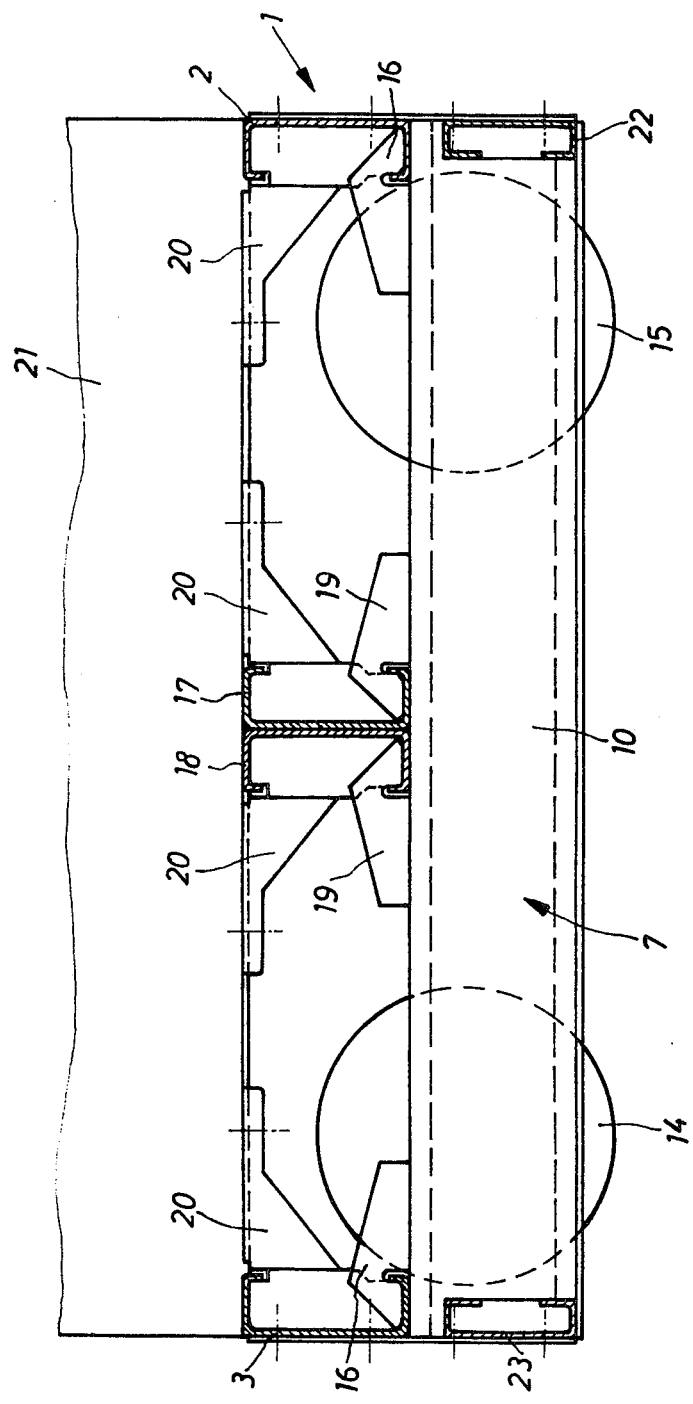
FIG. 3 is a cross-sectional view taken substantially along the line III—III of FIG. 1.

As will be apparent from the showing of FIGS. 1, 2 and 3, the undercarriage possesses a frame 1 composed of two main supports or carriers 2, 3 which are connected at their ends with one another by means of the side frame portions or components 4, 5. The main supports 2, 3 are arranged essentially in parallelism to one another and extend at right-angles to the direction of displacement, generally indicated by the double-headed arrow A in FIG. 1. As best seen by referring to FIG. 3 the main supports 2 and 3 which may be each constituted by profile or structural members, possess a substantially C-shaped cross-section which is inwardly opened. The connection between the main supports 2, 3 and the side frame components 4, 5 can be accomplished with the aid of screws or any other suitable fastening devices.

In the frame 1 there are arranged two wheel assemblies 6, 7. Each of these wheel assemblies 6 and 7 will be seen to possess two parallel transverse supports 8, 9 and 10, 11 respectively which likewise are formed from profile members having a substantially C-shaped cross-section. Between two neighboring transverse supports 8, 9 and 10, 11 there are arranged two respective rolls or rollers 12, 13 and 14, 15 which are rotatably mounted in the associated transverse supports 8, 9 and 10, 11. These transverse supports 8, 9, 10, 11 are detachably secured by means of connection elements 16 with the main supports 2, 3, and the construction of the connection elements 16 will be explained more fully hereinafter based upon the showing of FIGS. 6 and 7.

Between the main supports 2, 3 and parallel thereto there is provided a support element formed of two intermediate supports 17, 18 likewise formed of profile members having a substantially C-shaped cross-sectional configuration. The intermediate supports 17, 18 bear at their webs against one another. These intermediate supports 17, 18 are detachable secured by means of the connection elements 19 at the transverse supports 8, 9 and 10, 11. These connection elements 19 correspond in their construction to the connection elements 16 by means of which the transverse supports 8, 9, 10, 11 are secured to the main supports 2, 3.

Further, there are provided attachment elements 20 which can be suspended in the main supports 2, 3 and the intermediate supports 17, 18 and upon which there are supported the transverse walls of the structure of the container and with which there are connected the transverse walls by means of screws or equivalent structure. In FIG. 3 there is schematically shown one such transverse wall which has been designated by reference character 21. The construction of this attachment element 20 will be further explained on the basis of the showing of FIGS. 4 and 5.

Continuing, the undercarriage illustrated in FIGS. 1 to 3 serves for supporting a shelving- or cabinet structure which is accessible from both lengthwise sides. At the region of the intermediate supports 17, 18 there are thus provided not particularly illustrated partition walls which extend parallel to the intermediate supports and are supported at the transverse walls. Each transverse wall is attached by means of such attachment element 20 at the frame 1. At the transverse walls there are braced or supported the shelves of the structure. The load which acts upon the transverse walls when the shelves are occupied is transmitted through the agency of the attachment elements 20 to the undercarriage. Under certain circumstances it is possible to dispense with the use of the intermediate supports 17, 18, in which case each transverse wall is connected in the described manner only with the main supports 2, 3.

With the undercarriage illustrated in FIGS. 1 to 3 there are arranged beneath the main supports 2, 3 cover ledges or borders 22, 23 respectively, likewise possessing a substantially C-shaped cross-sectional configuration and which are threaded or otherwise suitably connected with the side frame components 4, 5.

One or both of these cover ledges 22, 23 can be replaced by a safety or protection barrier or beam, as the same will be explained more fully in conjunction with FIGS. 8 and 9.

Figure 4:
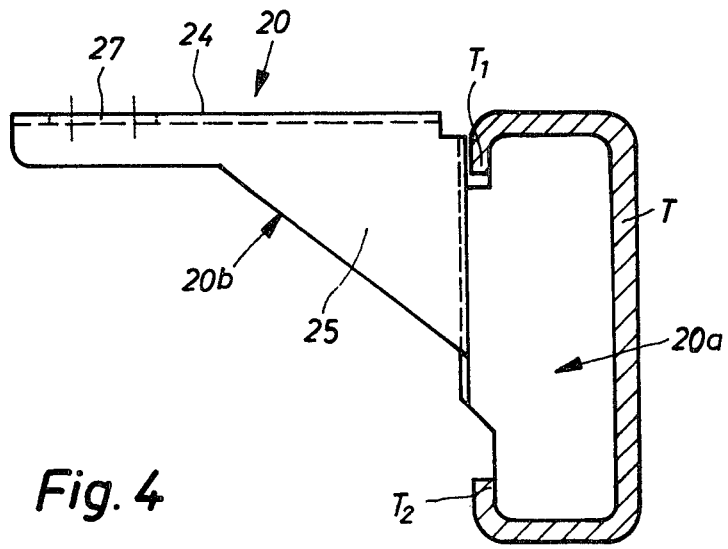
FIG. 4 illustrates details of an attachment element for the transverse walls as viewed from the side.
Figure 5:
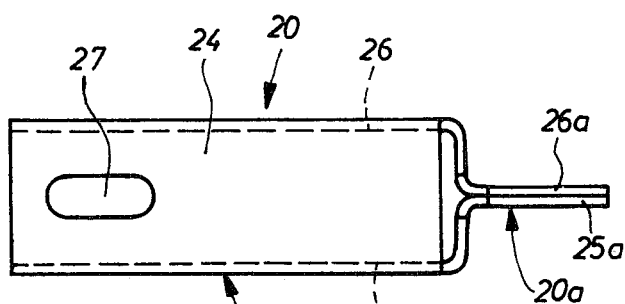
FIG. 5 is a plan view of the attachment element according to FIG. 4.

In FIGS. 4 and 5 there is illustrated an attachment element 20, and specifically FIG. 4 shows the same in side view and FIG. 5 in plan view. This attachment element 20 embodies a first portion 20a which can be inserted into the support or carrier T having a C-shaped cross-sectional configuration and a second portion 20b connected with the first portion, the second portion carrying the transverse wall. The support T of FIG. 4 can be constituted by a main support 2, 3 or an intermediate support 17, 18.

The first portion or part 20a has a shape which corresponds to the inner profile or configuration of the support T, so that this first part 20a when introduced into the support T is enclosed by such last-mentioned support. The end flange sections $T_1$ and $T_2$ of the support T engage about the first part 20a and in this way fixedly secure the attachment element 20.

The section 20b carrying the transverse wall exhibits a support surface 24 which is connected through the agency of two side flaps or tabs 25 and 26 with the first part or portion 20a which is formed by the sections 25a and 26a which are integral with the side flaps 25 and 26 respectively. The attachment element 20 is a one-piece structure and preferably consists of metal.

A hole or slot 27 is provided in the support surface 24 through which there can piercingly extend the screws or the like for attaching the non-illustrated transverse wall of the structure.

The attachments elements 20 can be introduced by means of the portion 20a into the support T at the desired location thereof by laterally tilting the same. After tilting back an attachment element 20 which has been introduced into the support T in the aforedescribed manner the portion 20a, as shown in FIG. 4, is situated behind the end flange sections $T_1$ and $T_2$ of the support T. The attachment element 20 is now held in the support T, but it can still be shifted in the lengthwise direction of the support. However, after securing the transverse wall at the attachment element its position is fixed.

Since the attachment elements 20 can be inserted at any desired position in the support T and can be further shifted at any time, it is possible to easily alter the position of the transverse walls, and specifically also after having finished manufacturing the frame 1.

It should be understood that the attachments elements 20 which can be suspended in the main supports 2, 3 and the intermediate supports 17, 18, respectively, also can be differently constructed from that shown, which is especially then the case when the supports possess a cross-sectional configuration other than a C-shape.

Figure 7:
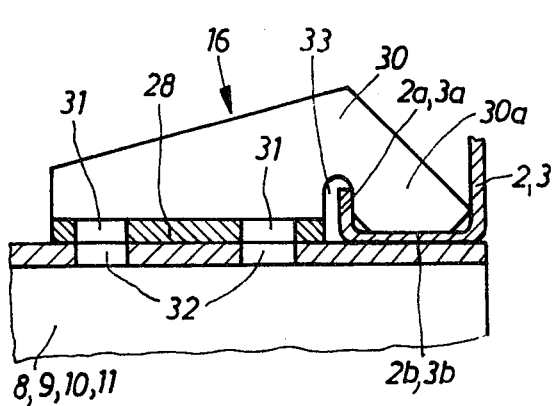
FIG. 7 is a cross-sectional view through the connection element of FIG. 6, taken substantially along the line VII—VII thereof.
Figure 6:
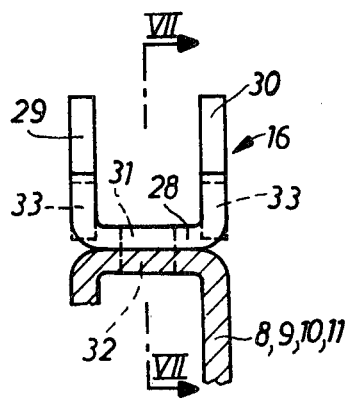
FIG. 6 is a front view of a connection element for securing the transverse supports.

In FIG. 6 there is shown in front view a connection element 16 and in sectional view in FIG. 7. In FIGS. 6 and 7 the main support 2 or 3 and one of the transverse supports 8, 9, 10 or 11 have been illustrated in order to clarify the connection between the main- and transverse supports.

The connection elements 16 will be seen to possess a substantially U-shaped cross-section and consists of a web 28 and two mutually parallel side portions 29, 30. In the web 28 there are provided throughpassage openings or holes 31 which align with appropriate throughpassage holes or openings 32 in the transverse supports 8, 9, 10 and 11. The attachment of the connection elements 16 at the transverse supports 8, 9, 10 and 11 respectively, occurs by means of screws or equivalent structure extending through the aligned throughpassage holes 31, 32.

In each of the side portions 29, 30 there is provided a recess 33 into which engages an end flange section 2a or 3a of the main support 2 or 3 respectively. The front ends 29a, 30a of the side portions 29, 30—and which front ends protrude past the web 28—engage into the interior of the associated main support 2, 3 and bears against a side flange 2b or 3b of the corresponding main support 2 or 3 respectively.

With the connection screws loosened the connection elements 16 together with the transverse supports 8, 9, 10 and 11 can be shifted along the corresponding main support 2, 3, so that it is possible to change the position of the wheel assembly 6, 7 in the frame 1. With the attachment or connection screws tightened the connection element 16 is fixedly connected on the one hand with the transverse supports 8, 9, 10 or 11 and on the other hand the front end 29a or 30a of the side portions 29 and 30 respectively, are pressed against the side flange 2b or 3b of the main support 2 or 3 respectively. Consequently, there is realized a stable connection between the main- and transverse supports.

The connection elements 19, serving to connect the transverse supports 8, 9, 10 and 11 with the intermediate supports 17, 18, are constructed the same as the connection elements 16. The connection between the transverse supports and the intermediate supports thus occurs likewise in the previously described manner.

It should be apparent that the connection elements 16 and 19 could be constructed differently than shown, particularly then in the case of supports having a cross-sectional configuration other than the illustrated C-shape.

As already previously mentioned a cover ledge or in the case of the cover ledges 22, 23 illustrated in FIGS. 1 to 3, can be replaced by a protection barrier or beam. Now in FIGS. 8 and 9 there is illustrated the attachment of one such protection beam.

In FIGS. 8 and 9 there is illustrated a main support, for instance the main support 2, and one of the transverse supports, for instance the transverse support 8, which are interconnected in the previously described manner by means of a connection element 16. Beneath the main support 2 there is arranged a protection beam 34 which protrudes past the main support 2. This protection beam 34 will be seen to possess a substantially C-shaped cross-sectional configuration and is attached by means of a hinge connection 35 at the transverse support 8. The protection beam 34 essentially extends over the entire length of the main support 2 and is connected with each wheel assembly and at the ends with the side frame components 4, 5 through the agency of hinge connection 35.

Each hinge connection or hinge connection arrangement 35 possesses a hinge plate 36 which is hingedly connected at one end by means of a bolt or shaft 37 with a holder element 38. The holder element 38 possesses a part or portion 38a which engages into the interior of the transverse support 8, this portion 38a is secured by means of a screw connection 39 or equivalent structure at the transverse support 8. The screw connection 39 at the same time interconnects the connection element 16 and the transverse support 8.

At the end opposite the shaft 37 the hinge plate 36 is hingedly connected via a bolt or shaft 40 with an attachment element 41. Attachment element 41 is connected by a screw connection 42 with a clamping element 43 arranged internally of the protection beam. The end flange sections 34a of the protection or safety beam 34 are fixedly clamped between the clamping plate 43 and the attachment element 41.

A leaf spring 45 is secured by means of a screw connection 44 at the holder element 38. This leaf or blade spring 45 bears against the inside of the protection beam 34 and pushes such outwardly relative to the frame 1, so that it, as shown in FIG. 9, protrudes past the main carrier 2.

This protection beam 34 serves the purpose, in the case of undercarriages which are driven electrically, hydraulically or pneumatically, of cutting-off the drive in the event there is present an obstruction or hinderance which impacts against the protection beam 34 during movement of the undercarriage.

Thus, if by virtue of such obstruction a force is exerted upon the protection beam 34 in the direction of the arrow B (FIG. 9), then the protection beam 34 is displaced parallel in the direction of the arrow B towards the frame against the force of the leaf springs 45 by means of the hinge connections 35. Consequently, the protection beam 34 activates a not particularly illustrated but conventional switch which in turn cuts-off the drive.

By virtue of the fact that the described undercarriage consists of threadably interconnected components the manufacture thereof can be carried out in a rational manner and there is possible an easy modification of the position of the attachment elements for the transverse walls and the spacing between the wheel assemblies.

While there are shown and described present preferred embodiments of the invention, it is to be distinctly understood that the invention is not limited thereto, but may be otherwise variously embodied and practiced within the scope of the following claims.

Accordingly, what is claimed is:

1. A traveling undercarriage for a container, comprising a substantially rectangular frame, said frame including two main supports which extend substantially parallel to one another and transversely with respect to the direction of movement of the undercarriage, means for interconnecting the main supports with one another at their ends, transverse supports extending between said main supports, rollers carried by the transverse supports, connection elements for detachably connecting the transverse supports carrying the rollers with the main supports, and attachment elements which can be suspended at the main supports at which there are connectable transverse walls of the container, and wherein each main support comprises a hollow profile member which is open at a side confronting the other main support and each connection element comprises a first section engaging into the interior of one of the main supports and a second section threadably connected with one of said transverse supports.

2. The undercarriage as defined in claim 1, wherein the hollow profile member possesses a substantially C-shaped cross-sectional configuration.

3. The undercarriage as defined in claim 1, wherein the hollow profile member possesses a substantially C-shaped cross-sectional configuration, each connection element possessing at least one recess into which engages an end flange section of one of the main supports.

4. The undercarriage as defined in claim 3, wherein each connection element possesses a substantially U-shaped cross-section and comprises a web bearing against its associated transverse support and two side portions essentially parallel to one another, said side portions having ends protruding past the web and engaging in the associated main support, each side portion having a recess for receiving an end flange section of the main support.

5. The undercarriage as defined in claim 1, wherein each attachment element comprises a first section engaging into the interior of the associated hollow profile member and a second section connected with the first section for supporting and attaching a transverse wall of the container.

6. The undercarriage as defined in claim 5, wherein the hollow profile member possesses a substantially C-shaped cross-sectional configuration, end flange sections of an associated main support engaging about the first section of the attachment element, the second section of said attachment element possessing a support surface for said transverse wall.

7. The undercarriage as defined in claim 1, further including a support element arranged between and essentially parallel to the main supports, said support element comprising a hollow profile member open in the direction of at least one of the main supports, further connection elements for connecting the support element with the transverse supports, said further connection elements being similarly constructed as the connection elements for interconnecting the transverse supports and main supports.

8. The undercarriage as defined in claim 7, wherein the support element comprises two intermediate supports having webs bearing against one another, each of the intermediate supports possessing a substantially C-shaped cross-sectional configuration.

9. The undercarriage as defined in claim 7, further including attachment elements which can be suspended in the support element for supporting and securing the transverse walls of the container, said attachment elements being of the same construction as the attachment elements which can be suspended in the main supports.

10. The undercarriage as defined in claim 1, wherein the means for interconnecting the main supports with one another at their ends comprise side frame components threadably connected with the main supports.

11. An undercarriage for a container, particularly an undercarriage equipped with an electrical, penumatic or hydraulic drive, comprising a substantially rectangular frame, said frame including two main supports which extend substantially parallel to one another and transversely with respect to the direction of movement of the undercarriage, means for interconnecting the main supports with one another at their ends, transverse supports extending between said main supports, rollers carried by the transverse supports, connection elements for detachably connecting the transverse supports carrying the rollers with the main supports, and attachment elements which can be suspended at the main supports at which there are connectable transverse walls of the container, and further comprising a protection beam arranged at least beneath one of the main supports and essentially parallel thereto, hinge connection means for connecting the protection beam with the transverse supports, and spring means for retaining the protection beam in a position protruding past the associated main support, said protection beam being displaceable against the spring force of said spring means in a direction transverse to its lengthwise direction when a force is applied to the protection beam in order to cut-off the drive.

12. The undercarriage as defined in claim 11, wherein each hinge connection means embodies a hinge element having opposed ends, one end of the hinge element being pivotably mounted at an associated transverse support about a first shaft, said hinge element being connected at the other end pivotably by means of a second shaft with the protection beam, both of the pivot shafts extending essentially parallel to one another.

13. A traveling undercarrige for a container, comprising a substantially rectangular frame, said frame including two main supports which extend substantially parallel to one another and transversely with respect to the direction of movement of the undercarriage, means for interconnecting the main supports with one another at their ends, transverse supports extending between said main supports, rollers carried by the transverse supports, connection elements for detachably connecting the transverse supports carrying the rollers with the main supports, and attachment elements which can be suspended at the main supports at which there are connectable transverse walls of the container, and wherein each main support comprises a hollow profile member which is open at a side confronting the other main support and each attachment element comprises a first section engaging into the interior of the associated hollow profile member and a second section connected with the first section for supporting and attaching a transverse wall of the container.

14. The undercarriage as defined in claim 13, wherein the hollow profile member possesses a substantially C-shaped cross-sectional configuration.

15. A traveling undercarriage for a container, comprising a substantially rectangular frame, said frame including two main supports which extend substantially parallel to one another and transversely with respect to the direction of movement of the undercarriage, means for interconnecting the main supports with one another at their ends, transverse supports extending between said main supports, rollers carried by the transverse supports, connection elements for detachably connecting the transverse supports carrying the rollers with the main supports, and attachment elements which can be suspended at the main supports at which there are connectable transverse walls of the container, and further including a support element arranged between and essentially parallel to the main supports, said support element comprising a hollow profile member open in the direction of at least one of the main supports, further connection elements for connecting the support element with the transverse supports, said further connection elements being similarly constructed as the connection elements for interconnecting the transverse supports and main supports.

16. The undercarriage as defined in claim 15, wherein each main support comprises a hollow profile member which is open at a side confronting the other main support.

17. The undercarriage as defined in claim 16, wherein the hollow profile member possesses a substantially C-shaped cross-sectional configuration.

* * * * *